3,381,047
CYCLODODECATRIENE-1,5,9 PROCESS
Herbert Sousa Eleuterio and Theodore Augur Koch, Wilmington, Del., assignors to E. I. du Pont de Nemours and Company, Wilmington, Del., a corporation of Delaware
No Drawing. Continuation-in-part of application Ser. No. 485,090, Sept. 3, 1965. This application Dec. 7, 1966, Ser. No. 599,721
8 Claims. (Cl. 260—666)

ABSTRACT OF THE DISCLOSURE

Aliphatic carboxylic acids are employed to increase the rate and yield in the trimerization of butadiene to form cyclododecatriene-1,5,9 using organoaluminum sesquichloride and titanium compounds as catalysts.

---

This application is a continuation-in-part of copending application Ser. No. 485,090, filed Sept. 3, 1965 by H. S. Eleuterio and T. A. Koch, now abandoned.

The present invention relates to a process for the trimerization of butadiene to cyclododecatriene-(1,5,9) using a catalyst prepared from an organoaluminum sesquihalide, an aliphatic acid and a selected tetravalent titanium compound.

The production of cyclododecatriene-(1,5,9) by subjecting butadiene to the action of various catalysts is known. Butadiene trimerization catalysts, based on alkylaluminum chlorides and titanium halides, such as those described in Schneider et al., United States Patent 3,076,045, and Wilke, United States Patent 2,964,574 are known.

The present invention is an improvement both in rate of reaction and in ultimate yield over these above-mentioned prior processes involving the use of a certain catalyst system under certain reaction conditions.

The catalyst system is prepared from the hereinafter defined organoaluminum sesquichloride, an aliphatic acid and titanium tetrachloride. Catalyst components are preferably limited to these three. For convenience, the exact composition of the organometallic compound may be varied and described as any composition having the following ratio of materials

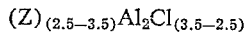

$$(Z)_{(2.5-3.5)}Al_2Cl_{(3.5-2.5)}$$

wherein Z is selected from the class consisting of alkyl radicals having 2–3 carbon atoms and the phenyl radical. When the process is conducted at about 1 p.s.i.g. pressure, the molar ratio of organoaluminum sesquichloride to the aforesaid acid should be maintained at from 1/0.1 mole to 1/0.50 mole with from 1/0.3 to 1/0.4 being especially the preferred range. As the pressure is increased above 1 p.s.i.g., the above ranges can be expanded, e.g., from 1/0.1 to 1/0.7 or greater.

The tetravalent titanium compounds which are operable in the present process are soluble in the reaction medium to the extent of at least 0.01 mole percent based upon cyclododecatriene at 20° C. and do not contain a substituent which inactivates the catalyst. These titanium compounds have the formula $TiA_4$ wherein A is selected from the class consisting of chlorine, bromine, iodine and OR, wherein R is a hydrocarbon radical having 1–20 carbon atoms. The four A's in a given titanium compound may be the same or different.

Acids which are operable in the present invention are selected from the class consisting of formic acid, oxalic acid, and aliphatic acids having 2–15 carbon atoms, aliphatic acids having 2–15 carbon atoms which are substituted with groups selected from the class consisting of alkyls having 1–6 carbon atoms, phenyl, and alkyl substituted phenyl having 7–12 carbon atoms and wherein at least 1 alpha carbon atom in the main chain of said aliphatic and substituted aliphatic acids has at least one and preferably at least two hydrogen atoms attached thereto. Other substituents on the acid that do not adversely affect the catalyst or the yield to the desired products are within the purview of this invention, e.g., acids having halogen substituents sufficiently removed from the carboxyl groups are operable. Illustrations of the acids contemplated by the above definition are saturated and unsaturated, mono-, di-, and tricarboxylic acids such as formic; propionic; butyric; lauric; pentadecanoic; acrylic; crotonic; sorbic; nonanoic; 3-hexyl-; decanoic, 4-butyl-; crotonic, 3-methyl-; 2,5-heptadienedioic, 4-pentyl-; 1,2,4-hexanetricarboxylic; 3-hexynedioic; 4,6-decadiynedioic; pentyn-4-oic acid; capric; pelargonic; isobutyric; isovaleric; oxalic; malonic; pimelic; sebacic; azelaic; isocaproic; isoenanthic; succinic; glutaric; adipic; 1,12-dodecanedioic; and $\alpha,\beta$-dimethyl-butyric acid. Formic and acetic acids are preferred.

The ratio of organoaluminum sesquichloride to the titanium compound is not so critical. The molar ratio of ethylaluminum sesquichloride to titanium tetrachloride may be varied from 3/1 to 30/1. Higher ratios may be used but are not desirable because of the expense of the ethylaluminum sesquichloride.

The catalyst may be made up by reacting the acid with ethylaluminum sesquichloride followed by reaction of the product so formed with titanium tetrachloride. However, for continuous operation, it is convenient to add all three catalyst components separately and simultaneously to the reaction vessel.

The butadiene trimerization reaction can be run in any inert hydrocarbon solvent such as benzene, cyclohexane, toluene, xylene and hexane. Cyclododecatriene is an excellent solvent and the preferred one for continuous trimerization of butadiene.

The butadiene trimerization reaction temperature should be maintained at from 20° to 120° C., and preferably from 60° to 90° C. At lower temperatures, the reaction rates become unduly slow and at higher temperatures, increasing yield losses to by-products occur.

Pressure is not a critical variable in the instant invention and may be varied from ½ atm. to 50 atm., preferably at from 1 to 5 atm. Increasing the pressure in many cases will improve the productivity of the catalyst.

By operating within the hereinabove set forth limits, butadiene trimer is formed at above the average reaction rates in the absence of an acid and in yields usually greater than 80 percent. The reaction can be conducted in multiple stages.

The following examples are illustrative of the invention.

Examples 1—7

The apparatus employed for the trimerization consists of a 2 liter, 3-necked, creased, round-bottomed flask fitted with rubber stopper, condenser with outlet to mercury bubbler, thermometer, high speed stirrer, and gas inlet. After the apparatus is well dried and flushed with inert gas, 150 ml. of benzene which is dried and rendered oxygen-free by distillation from sodium potassium alloy under nitrogen is added to the flask. The benzene is heated to 55° C.±5° C. and acetic acid as a 0.4 M solution in benzene and a 1 M solution of ethyl aluminum sesquichloride in benzene in the amounts indicated in Table I is injected with moderate agitation followed by 1 millimole of titanium tetrachloride as 10 ml. of a 0.1 M solution in benzene. The rate of stirring is then increased to 2000 r.p.m. Butadiene, purified by stirring with and distillation from triisobutyl aluminum, is passed into the reactor slightly more rapidly than it is adsorbed to maintain a purge of a few cc./min. through the trap. The reaction temperature is maintained at 70± 2° C. After the time shown in the table, the catalyst is deactivated with a 10 ml. sample of a 1:1 mixture of acetone and isopropyl alcohol and a sample of the crude reaction mixture is analyzed immediately by gas chromatography. The average rate of the reaction throughout a run is given as the number of g./min. of pure cyclododecatriene actually produced. Example 7 illustrates the poor rate and yield obtained in the absence of the acid.

TABLE I

| Ex. | Et₃Al₂Cl₃: Acetic Acid Molar Ratio | Millimoles of Et₃Al₂Cl₃ | Time (min.) | Yield (Percent) | Rate (g./min.) |
|---|---|---|---|---|---|
| 1 | 1:0.4 | 8.66 | 84 | 92 | 6.65 |
| 2 | 1:0.5 | 8.33 | 40 | 89.5 | 2.0 |
| 3 | 1:0.39 | 8.71 | 75 | 91 | 6.4 |
| 4 | 1:0.40 | 8.60 | 80 | 91 | 6.9 |
| 5 | 1:0.60 | 8.00 | 100 | 76.5 | 2.4 |
| 6 | 1:0.20 | 9.32 | 60 | 89 | 6.15 |
| 7 | 1:0.00 | 6.00 | 28 | 60 | 0.1 |

The optimum ratio of ethylaluminum sesquichloride to acetic acid as shown by the above data is about 1/0.4.

Example 8

A 500 cc. reaction vessel is equipped with inlets for continuous introduction of the solutions of the cataylst components substantially as described in Paragraph 1 of Examples 1–7 and dry butadiene. Liquid product is continuously removed such that steady state conditions prevail. The conditions and results are reported in Table II.

TABLE II

Example 8:
Catalyst ratio moles Et₃Al₂Cl₃/TiCl₄/
  acetic acid _____ 10/1/4.0
Steady state productivity pounds crude/
  gal of crude in reactor/hour _____ 7.17
Feed rate TiCl₄ gm./gal./hour _____ 1.0
Steady state TiCl₄ conc. gram TiCl₄/
  gal. _____ 1.0
Temperature, °C. _____ 75
Pressure, p.s.i.g. _____ 1
Percent distribution in crude:
  Cyclododecatriene _____ 87.7
  Cyclooctadiene _____ 0.74
  Vinylcyclohexane _____ 1.08
  Polymer _____ 8.67

Examples 9–27

A 500 cc. reaction vessel is equipped with inlets for the continuous introduction of the solution of the catalyst and butadiene which is dried in the liquid phase with a molecular sieve and is introduced as a gas by vaporizing in the presence of tri-n-butyl aluminum. The inlets are arranged to permit the introduction of ethylaluminum sesquichloride (except Example 21 which uses phenyl aluminum sesquichloride), the titanium compound and the acid is separate streams. As in Example 8, a liquid product is continuously removed such that a steady state condition prevails. The runs are started by filling the reactor with dry cyclododecatriene and sufficient catalyst for one hour of operation. Butadiene gas is introduced in amounts sufficient to maintain 1 p.s.i.g. during the run (except Examples 22–27 which were conducted at 5 p.s.i.g.). The reaction is conducted at 75° C. Except where indicated, the titanium compounds are added as a 10% solution in cyclohexane and at the rate of 1.01 g. of titanium tetrachloride per gallon per hour or the equivalent thereof. The adipic and dodecanedioic acids were prereacted with the sesquichloride in toluene while maintaining a local excess of the sesquichloride in order to obtain a clear solution. The dicarboxylic acids are insoluble initially but go into solution as their reaction with the sesquichloride progresses. For adipic, to 200 cc. of toluene was added 3.65 grams of adipic acid and 31.67 grams of the sesquichloride; for dodecanedioic, to 200 cc. of toluene were added 5.76 grams of dodecanedioic and 32.2 grams of the sesquichloride. The prereacted mixture was then added to the reactor. The composition of the product along with the other experimental results are shown in Table III.

TABLE III

| | 9 | 10 | 11 | 12 | 13 | 14 | 15 | 16 | 17 | 18 | 19 |
|---|---|---|---|---|---|---|---|---|---|---|---|
| Catalyst: | | | | | | | | | | | |
| Molar Ratio (C₂H₅)₃Al₂Cl₃/TiA₄/Acid | 10/1/5 | 10/1/4 | 10/1/3 | 10/1/2 | 10/1/3 | 10/1/4 | 10/1/3.5 | 10/1/3.5 | 10/1/5 | 10/1/4 | 10/1/1.96 |
| A | Cl⁻ | Cl⁻ | Cl⁻ | Cl⁻ | Cl⁻ | Cl⁻ | Isopropoxide [3] | I [4] | Cl⁻ | Cl⁻ | Cl⁻ |
| Acid | Acetic [1] | Acetic [2] | Acetic [1] | Formic [9] | Formic [9] | Formic [9] | Formic [7] | Formic [7] | Formic [9] | Lauric [8] | Adipic |
| Steady State Productivity: (Pounds of crude/gal. of crude in reactor/hour) | 6.30 | 7.05 | 6.05 | 5.80 | 7.96 | 7.81 | 7.73 | 5.2 | 4.00 | 5.34 | 4.06 |
| Product Distribution in Crude Product: | | | | | | | | | | | |
| Cyclododecatriene | 84.6 | 86.3 | 84.1 | 84.9 | 86.0 | 85.3 | 85.8 | 82.5 | 73.9 | 85.9 | 82.8 |
| Cyclooctadiene | 1.17 | 1.49 | 2.05 | 3.83 | 2.80 | 2.03 | 3.79 | 1.50 | 1.00 | 1.32 | 0.63 |
| Vinyl Cyclohexane | 1.15 | 1.13 | 1.04 | 1.45 | 1.25 | 0.97 | 2.07 | 0.68 | 0.37 | 0.99 | 3.87 |
| Nonvolatile residue | 10.1 | 8.56 | 8.99 | 7.99 | 8.43 | 7.96 | 5.45 | 13.2 | 26.7 | 10.7 | 10.8 |

| | 20 | 21 | 22 [11] | 23 [11] | 24 [11] | 25 [11] | 26 [11] | 27 [11] |
|---|---|---|---|---|---|---|---|---|
| Catalyst: | | | | | | | | |
| Molar Ratio (C₂H₅)₃Al₂Cl₃/TiA₄/acid | 10/1/1.92 | 10/1/4 [5] | 10/1/4 | 10/1/4 | 10/1/4 | 10/1/4 | 10/1/4 | 10/1/4 |
| A | Cl⁻ | Br⁻ | Cl⁻ | Cl⁻ | Cl⁻ | Cl⁻ | Cl⁻ | Cl⁻ |
| Acid | Dodecanedioic | Formic [10] | Acetic [12] | Crotonic [13] | Phenyl acetic [14] | 10-undecenoic [15] | Acrylic [16] | Isobutyric [17] |
| Steady State Productivity: (Pounds of crude/gal. of crude in reactor/hour) | 4.38 | 6.78 | 8.28 | 4.81 | 7.05 | 6.37 | 6.88 | 3.59 |
| Product Distribution in Crude Product: | | | | | | | | |
| Cyclododecatriene | 84.2 | 80.9 [6] | 87.9 | 84.9 | 88.0 | 85.9 | 85.0 | 82.3 |
| Cyclooctadiene | 0.54 | 4.47 | 1.09 | 0.95 | 1.25 | 0.83 | 1.46 | 0.66 |
| Vinyl cyclohexane | 3.49 | 1.19 | .79 | 1.25 | 0.90 | 0.75 | 0.99 | 1.48 |
| Nonvolatile residue | 9.86 | 13.4 | 9.15 | 10.9 | 8.82 | 11.2 | 9.97 | 13.1 |

[1] Added as 2.71 M in cyclohexane.
[2] Vaporized and added with the dry butadiene.
[3] Added as 0.298 M in cyclohexane.
[4] Added as 0.015 M in cyclohexane (somewhat unstable in solution).
[5] The catalyst was phenylaluminum sesquichloride added as a 40% by weight solution in chlorobenzene.
[6] Normalized.
[7] Added as 1.59 M in benzene.
[8] Added as 0.681 M in benzene.
[9] Added as 1.30 M in benzene.
[10] Added as 1.36 M in benzene.
[11] Operation at 5 p.s.i.g.
[12] Added as 1.99 M in cyclohexane.
[13] Added as 0.458 M in cyclohexane.
[14] Added as 0.415 M in benzene.
[15] Added as 1.05 M in cyclohexane.
[16] Added as 2.98 M in cyclohexane.
[17] Added as 2.17 M in cyclohexane.

Cyclododecatriene is a valuable chemical intermediate which can be readily oxidized to succinic acid which is useful in the production of plastics such as polyamides. It also may be hydrogenated in a known manner. Thus, cyclododecene or cyclododecane is obtained from cyclododecatriene. These hydrogenated products may, in turn, be oxidized in known manner to form the corresponding dicarboxylic acids.

We claim:

1. A process for the production of cyclododecatriene-1,5,9 which comprises contacting butadiene with a catalyst system formed by mixing an organoaluminum compound having the formula $$(Z)_{(2.5-3.5)}Al_2Cl_{(3.5-2.5)}$$

wherein Z is selected from the class consisting of alkyl radicals having 2 to 3 carbon atoms and the phenyl radical with from about 0.10 to about 0.70 mole of an aliphatic carboxylic acid having 1 to 15 carbon atoms and a titanium compound having the formula $TiA_4$ where A is selected from the class consisting of chlorine, bromine, iodine and OR, where R is a hydrocarbon radical having 1 to 20 carbon atoms, in an amount such that the molar ratio of said organoaluminum compound to said titanium compound is maintained at from 3-30/1 and at a temperature in the range of 20 to 120° C. and at a pressure of 0.5–50 atmospheres.

2. The process of claim 1 wherein said organoaluminum compound is ethylaluminum sesquichloride.

3. The process of claim 2 conducted in the range 60 to 90° C.

4. A process for the preparation of cyclododecatriene-1,5,9 which comprises contacting butadiene with a catalyst consisting essentially of ethylaluminum sesquichloride from 0.20 to 0.40 mole per mole of said sesquichloride of an aliphatic monocarboxylic acid having 1 to 10 carbon atoms and titanium tetrachloride in an amount such that the molar ratio of said sesquichloride to titanium tetrachloride is maintained at from 3–30/1 at a temperature of 60 to 90° C. and at a pressure of 0.5–50 atmospheres.

5. The process of claim 1 wherein said acid is acetic acid.

6. The process of claim 1 wherein said acid is formic acid.

7. The process of claim 4 wherein said acid is acetic acid.

8. The process of claim 4 wherein said acid is formic acid.

References Cited

UNITED STATES PATENTS 3,163,611  12/1964  Anderson et al. _____ 252—429
3,280,205  10/1966  Yosida et al. _____ 260—666

DELBERT E. GANTZ, *Primary Examiner.*

V. O'KEEFE, *Assistant Examiner.*